United States Patent
Preston

(10) Patent No.: US 6,886,785 B2
(45) Date of Patent: May 3, 2005

(54) RAM AIR PARACHUTE WITH MULTISTAGE DEPLOYMENT

(75) Inventor: Daniel Preston, Kew Gardens, NY (US)

(73) Assignee: Atair Aerospace, Brooklyn, NY (US)

(*) Notice: Subject to any disclaimer, the term of this patent is extended or adjusted under 35 U.S.C. 154(b) by 0 days.

(21) Appl. No.: 10/315,486

(22) Filed: Dec. 9, 2002

(65) Prior Publication Data

US 2004/0016851 A1 Jan. 29, 2004

Related U.S. Application Data

(60) Provisional application No. 60/340,910, filed on Dec. 7, 2001.

(51) Int. Cl.[7] .............................. B64D 17/02
(52) U.S. Cl. ...................... 244/145; 244/146
(58) Field of Search ............... 244/150, 145, 244/146, 142, 152

(56) References Cited

U.S. PATENT DOCUMENTS

| | | | | |
|---|---|---|---|---|
| 3,945,592 A | * | 3/1976 | Sutton | 244/152 |
| 4,540,145 A | | 9/1985 | Matsuo | 244/152 |
| 4,771,970 A | * | 9/1988 | Sutton | 244/145 |
| 5,005,785 A | * | 4/1991 | Puskas | 244/152 |
| 5,201,482 A | | 4/1993 | Ream | 244/145 |
| 5,213,288 A | * | 5/1993 | Girdwood | 244/145 |
| 5,893,536 A | * | 4/1999 | Lee et al. | 244/149 |
| 6,220,547 B1 | * | 4/2001 | Smith et al. | 244/147 |

OTHER PUBLICATIONS

International Search Report for PCT/US02/39519; mailing date: Sep. 15, 2003.

* cited by examiner

*Primary Examiner*—J. Woodrow Eldred
(74) *Attorney, Agent, or Firm*—Borque & Assoc., PA

(57) ABSTRACT

A ram air parachute of the present invention includes specific cross porting of the ribs between certain cells to create a two-stage or multi-stage deployment. Cross ports between certain sets of cells have reduced or no conductance. In this manner, the center cells of the canopy open first, slowing decent, before the outer cells. The staged deployment reduces the opening forces on the pilot particularly in high speed flights.

6 Claims, 6 Drawing Sheets

RAM AIR PARACHUTE WITH MULTISTAGE DEPLOYMENT

This application claims priority to U.S. Provisional Application Ser. No. 60/340,910, filed Dec. 7, 2001.

BACKGROUND OF THE INVENTION

1. Field of the Invention

The invention relates to generally to parachutes and more particularly to ram air parachutes having an improved canopy design providing reduced opening forces.

2. Discussion of Related Art

Parachutes have evolved over the years into highly sophisticated systems, and often include features that improve the safety, maneuverability, and overall reliability of the parachutes. Initially, parachutes included a round canopy. A skydiver was connected to the canopy via a harness/container to suspension lines disposed around the periphery of the canopy. Such parachutes severely lacked control. The user was driven about by winds with little mechanism for altering direction. Furthermore, such parachutes had a single descent rate based upon the size of the canopy and the weight of the parachutist. They could not generate lift and slowed descent only by providing drag.

In the mid-1960's the parasol canopy was invented. Since then, variations of the parasol canopy have replaced round canopies for most applications, particularly for aeronautics and the sport industry. The parasol canopy, also known as a ram air canopy, is formed of two layers of material—a top skin and a bottom skin. The skins may have different shapes but are commonly rectangular or elliptical. The two layers are separated by vertical ribs to form cells. The top and bottom skins are separated at the lower front of the canopy to form inlets. During descent, air enters the cells of the canopy through the inlets. The vertical ribs are shaped to maintain the canopy in the form of an airfoil when filled with air. Suspension lines are attached along at least some of the ribs to maintain the structure and the orientation of the canopy relative to the pilot. The canopy of the ram air parachute functions as a wing to provide lift and forward motion. Guidelines operated by the user allow deformation of the canopy to control direction and speed. Ram air parachutes have a high degree of maneuverability.

Canopies are flexible and stretchable membrane structures, they distort based upon mechanical and aerodynamic tensions, stresses, airflows and pressure distribution. Although a cell is modeled as having a basically rectangular cross section, when inflated the shape distorts towards round with complex distortions. Typically, in a ram air parachute, suspension lines are not attached to every rib, thus creating loaded ribs (i.e., ribs to which suspension lines are attached) and non-loaded ribs (i.e., ribs which do not have suspension lines attached thereto). Non loaded ribs will float higher than the loaded ribs creating an additional certain amount of span-wise aerodynamic distortion on the top skin of the airfoil. This distortion is aerodynamically undesirable and reduces the efficiency and performance of the canopy.

In order to keep the loaded and non-loaded ribs level and to improve upon the aerodynamics of the canopy, cross-bracing between ribs has been added to some canopy designs. Cross bracing is the use of diagonal ribs in addition to vertical ribs to create more loaded rib-top skin junctions without adding more lines which would increase drag and possible deployment malfunctions. Perfection of the top profile of the airfoil is far more important aerodynamically than the bottom profile. U.S. Pat. No. 4,930,927 illustrates such a design. Cross-braced designs suffer from a number of drawbacks. Cross-bracing results in very complicated construction, high manufacturing costs, and increased packing volume. The standard cross braced design is a 'tri cell' construction with a packing volume approximately twenty-five (25) % larger than an equivalent non-cross braced design. Furthermore, the increased rigidness induced by the cross-bracing creates higher opening forces for the pilot. Typically, large cross porting is used on all of the cells to reduce pack volume which does nothing to slow the canopy's inflation on deployment. The opening forces can be so severe that they can jar the jumper's body causing discomfort and even serious injuries. Although designers have implemented "formed" noses, larger sliders, moved bridal attachment points and modified line trims to try to soften the openings of such cross-braced canopies, it has generally yielded only limited improvement.

Prior art canopies use cross porting in their ribs. Upon deployment of the canopy air enters the center cell inlet first and then rapidly inflates the canopy through the crossports and presenting inlets. Slow motion video will show that canopies substantially fully inflate before the slider is pushed ⅓ to ½ of the way down the suspension lines. As the lines are restricted by routing through the slider grommets, the inflating canopy can't maintain a straight leading edge. Instead it violently snakes until the slider is pushed down far enough. This snaking is undesirable causing off heading deployments and in higher performance elliptical planforms frequent line twists or spinning malfunctions.

This method in which a ram air canopy inflates once deployed in freefall has remained basically unchanged for thirty (30) years since the invention of slider reefing. At that time the terminal velocity of a jumper or max speed a jumper would reach before deploying their parachute was typically one hundred twenty (120) mph. In the last ten (10) years new flying disciplines has led to significantly higher terminal velocities. In the early days the only style of body flight in freefall was a belly to earth position that limited terminal velocity to about one hundred twenty (120) mph, now a days 'freeflyers' fall with their body positioned vertically typically head down and fall at average speeds of one hundred forty to one hundred eighty (140–180) mph, and 'speed' divers fly in vertical positions with arms and legs tucked in streamlined and can reach speeds of over three hundred (300) mph. At speeds over one hundred twenty (120) mph with prior art canopies a jumper runs the serious risk of injury and even death from the increased opening shock. Prior art canopies open taster as your speed at deployment increases. Jumpers who fly at higher speeds endeavor to slow down during freefall before deploying the parachute by transitioning to a belly to earth position and waiting, but they often do not slow sufficiently to achieve acceptable opening forces. Additionally there is always the common possibility of a premature deployment where your canopy is deployed unintentionally early in the dive. Therefore, a need exists for a safer parachute providing reduced opening force at the higher decent rates being practiced.

SUMMARY OF THE INVENTION

The present invention substantially overcomes the deficiencies of the prior art through a canopy having multistage deployment. According to one aspect of the present invention, the conductance of cross porting in the ribs of the canopy is restricted at certain locations to control the inflation of the canopy. In particular, a canopy of the present invention has a first set of ribs with a first cross porting structure and a second set of ribs with a second cross porting structure. The first cross porting structure allows greater flow of air from one cell to an adjacent cell. The second cross porting structure limits airflow. Thus, upon deployment, cells connected with the second cross porting structure are inflated more slowly. The pilot experiences lower opening forces at several different times until the canopy is fully deployed. Furthermore, the partial opening of the canopy slows decent before the subsequent stages occur. According to another aspect of the invention, a nine (9) cell canopy opens in two (2) stages consisting of the center three (3) cells in a first stage and the outer six (6) cells in a second stage.

According to another aspect of the invention, a canopy of the present invention includes cross porting in ribs which varies over the entire span of the canopy. The conductance of the cross-ports are reduced from the center cell towards the end cells by reducing the cross-port area in subsequent ribs. Deployment of a canopy with such cross porting results in a slowed and more ordered opening. The inner cells open first, which slows decent, followed by adjacent cells till the end cells. The pilot experiences lower opening force over the time period of the delayed opening.

According to another aspect of the invention, a canopy of the present invention can maintain a straight leading edge through deployment. The center cell will inflate first and as the remaining cells inflate in sequence the leading edge unrolls from the center towards the end cells.

According to another aspect of the invention, a canopy of the present invention allows safer higher speed deployments. By restricting inlet air from the center cells a canopy is created that has far less spreading force to push the slider down. Therefore at higher speeds the aerodynamic force holding the slider up is greater than the slider force pushing it down. The slider is effectively prevented from coming down the lines until the center inflated cells decelerate the speed. As opposed to prior art canopies that will open faster at higher speeds, the inventive canopy can open slower with increasing speed over a particular design range. With the inventive canopy peak opening forces have been measured in the six to eight (6–8) g range at speeds up to two hundred fifty-six (256) mph. Where as prior art canopies have been recorded at over fifty (50) g at speeds of only one hundred fifty (150) mph. A six (6) g opening is soft and almost unnoticeable, ten (10) g's is painful, over thirteen (13) g's you begin to see injuries, i.e. spinal fractures in the neck.

Prior art canopies almost exclusively use the same airfoil. With this airfoil it is desirable to suspend the jumper towards the nose of the canopy. According to another aspect of the invention, the chosen airfoil, planform and trim is such as to allow the jumper to be suspended back from the leading edge of the wing. The parachute with trim according to this embodiment of the invention when the parachute deploys exhibits a pronounced un-folding of the leading edge from the center cells outward as the slider descends unrestricting the lines. As such upon deployment, the inlets to the outer cells are not exposed to airflow until the slider has moved at least part of the way down the suspension lines. According to this aspect of the invention, cross porting to the outer cells is limited. Thus, the outer cells inflate less rapidly than the interior cells of the canopy since the inlets and cross porting are reduced. Deployment of the canopy is slowed and opening forces are reduced.

DESCRIPTION OF THE INVENTION

Figure 1:
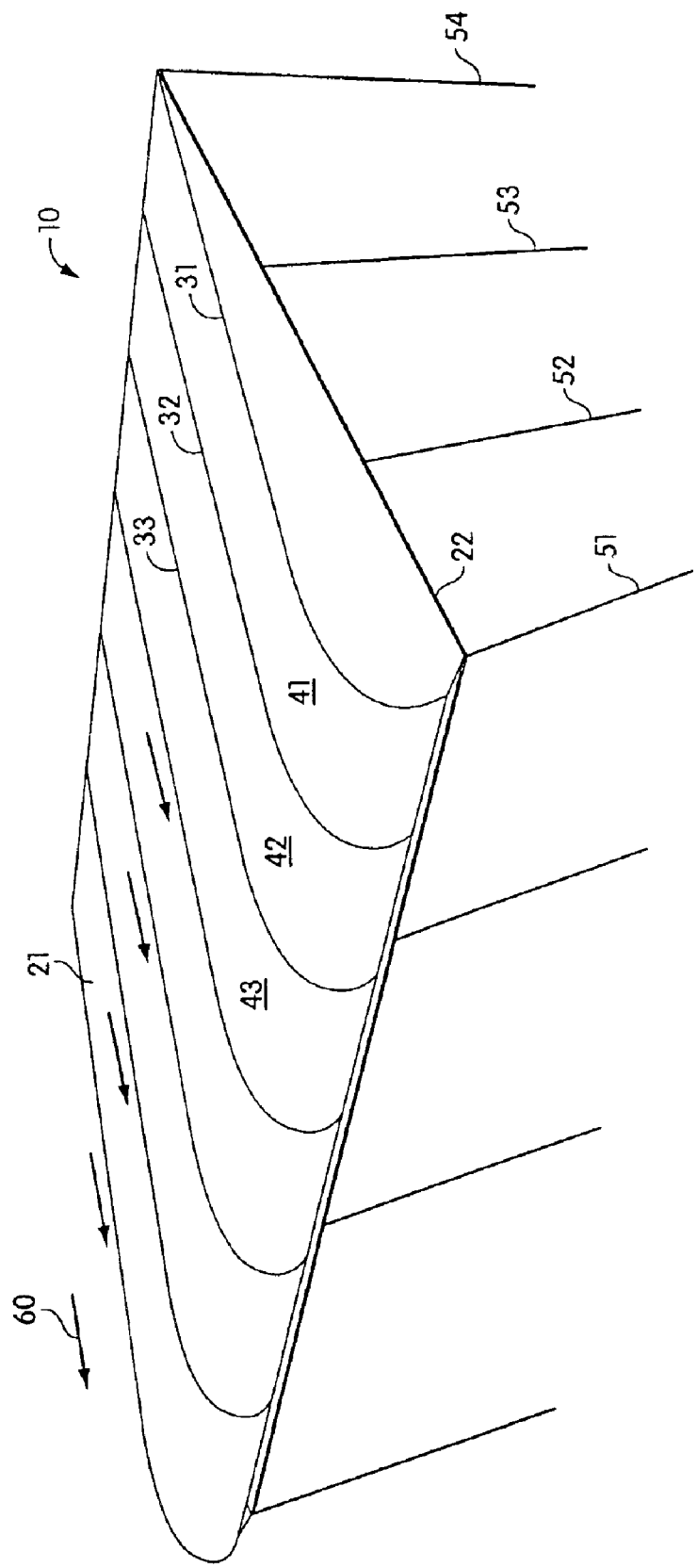
FIG. 1 is a perspective view of a ram air parachute.

FIG. 1 illustrates a canopy of a ram air parachute 10 according to an embodiment of the present invention. The ram air parachute 10 includes a top skin 21 and bottom skin 22. A plurality of vertical ribs 31, 32, 33 are formed between the top skin 21 and the bottom skin 22 forming a plurality of cells 41, 42, 43. Typically, ram air parachutes to which the present invention applies have seven (7) or nine (9) cells. However, any number of cells can be used in connection with the present invention. Suspension lines 51, 52, 53, 54 are attached to at least some of the plurality of ribs. Not all of the suspension lines are shown in FIG. 1. Generally, suspension lines are attached to every other rib in the ram air parachute. The suspension lines are connected together to provide proper suspension of the user below the canopy and maintain the structure and the orientation of the canopy with respect to the pilot. FIG. 1 illustrates an elliptical canopy, but any shape canopy could be used. During operation of the ram air parachute 10, the cells 41, 42, 43 of the canopy fill with air and create an airfoil shape for the canopy. The airfoil shape of the canopy induces forward motion, illustrated as 60, to the canopy and the user. Canopies may or may not have cross braces for controlling the deployed shape of the canopy. The present invention is applicable to either type of canopy.

Upon deployment, air enters the inlets at the front edge of the cells. The air inflates the canopy to form the airfoil shape. In order to control the speed of deployment, a slider (not shown) is attached to the suspension lines below the canopy. Sliders are generally known in the art as illustrated in U.S. Pat. No. 5,005,785. A slider is a rectangular piece of material with grommets at the four corners. The suspension lines are grouped through the grommets. During deployment, the slider is forced downward by the spreading force of the inflating canopy. The relative wind provides resistance to slow the slider from traveling down the lines. In addition to air entering a cell through its corresponding inlet, air can pass through cross ports, or openings, in the ribs from one cell to another.

Figure 2:
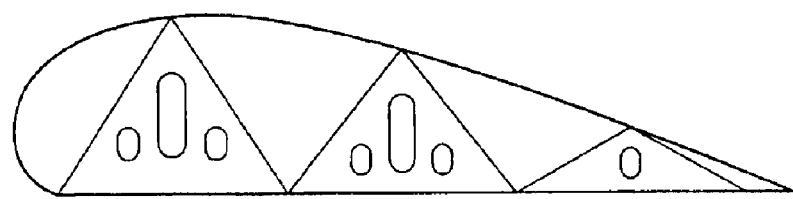
FIG. 2 is a side view of a rib of a ram air parachute according to the prior art.
Figure 3A:
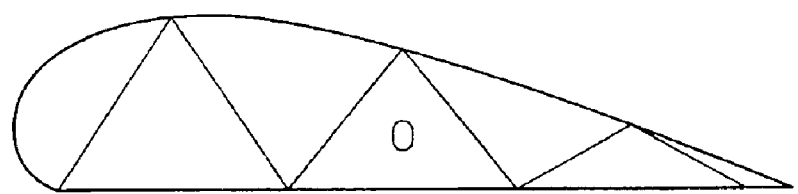
FIGS. 3A and 3B are side views of ribs of a ram air parachute according to an embodiment of the present invention.
Figure 3B:
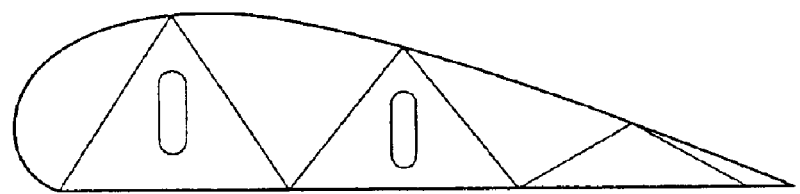
Figure 4A:
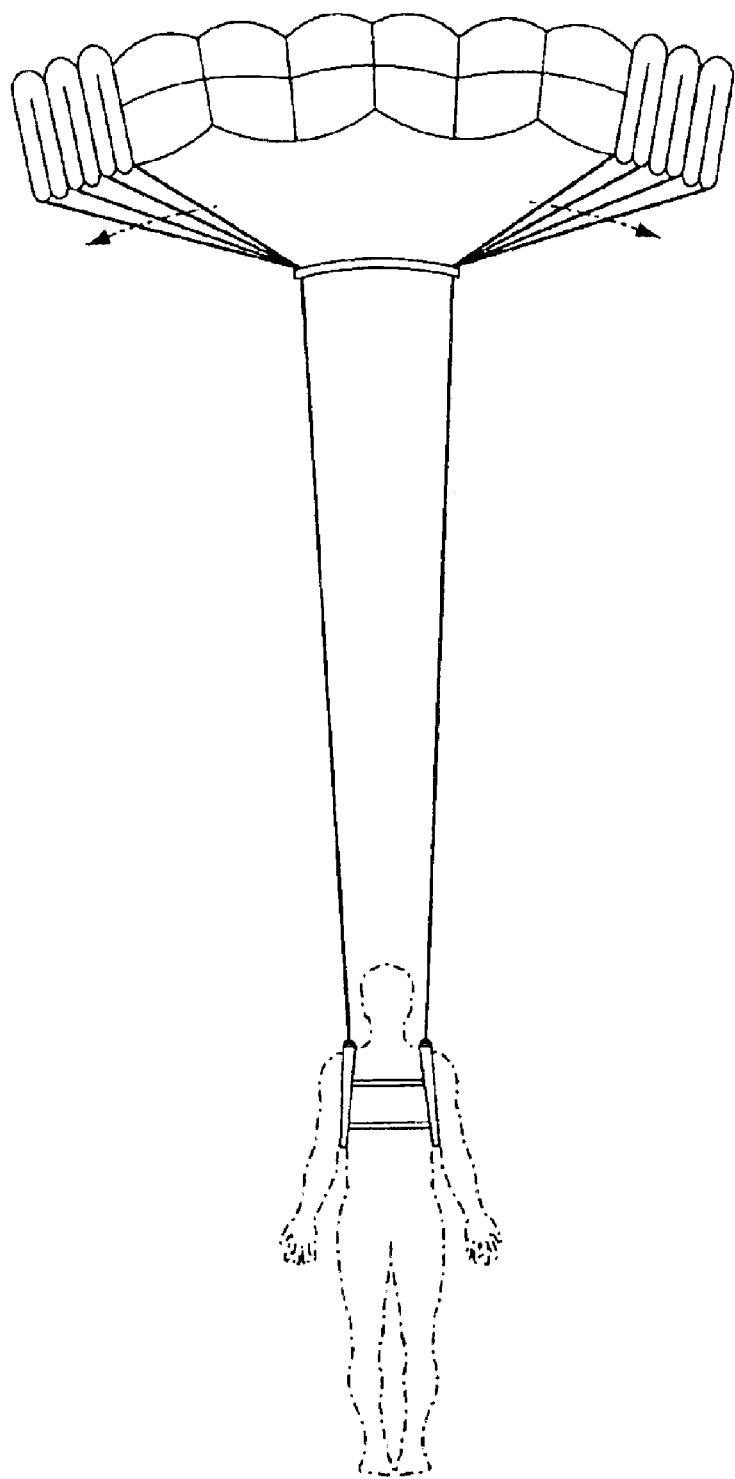
FIGS. 4A and 4B illustrate staged inflation of a ram air parachute according to an embodiment of the invention.
Figure 4B:
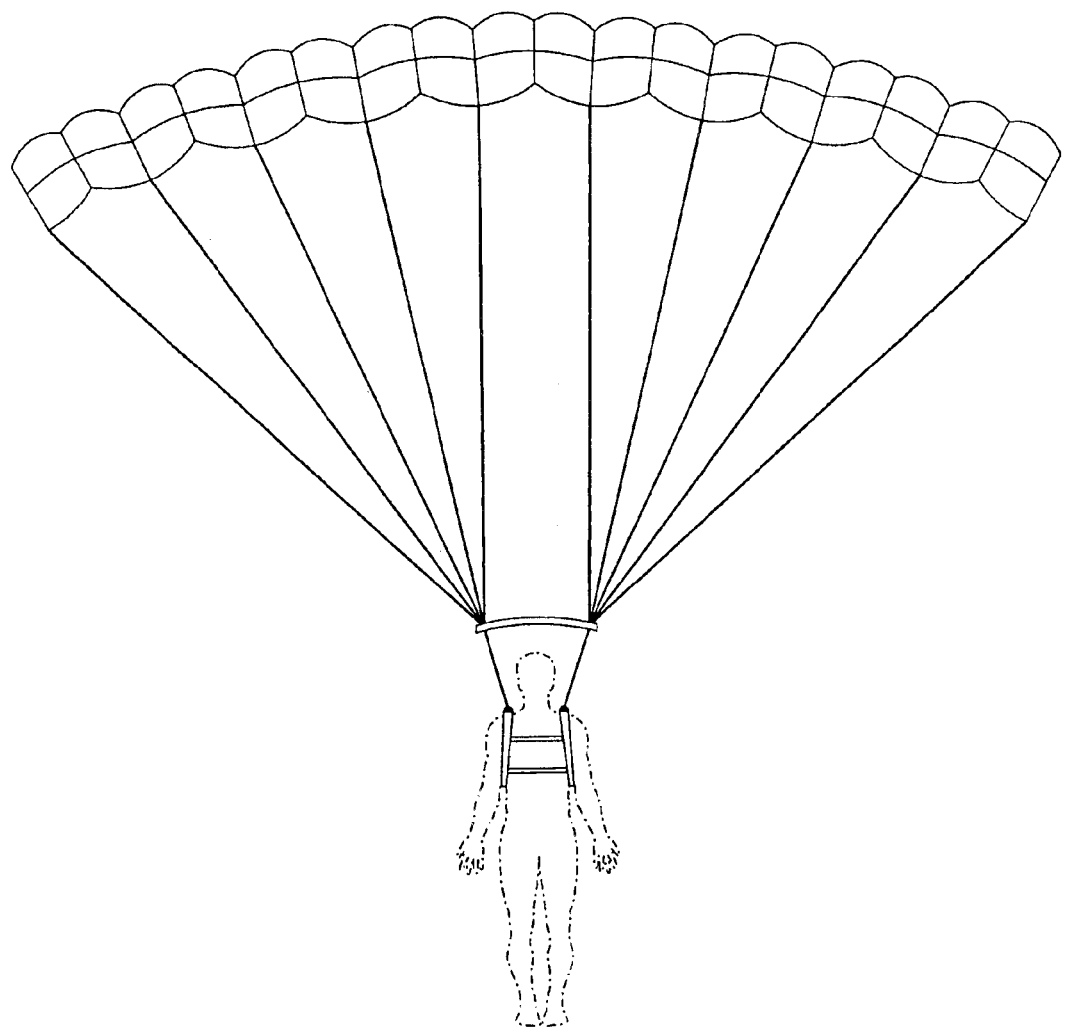
Figure 5A:
FIGS. 5A–5H illustrate inflation over time of a ram air canopy according to an embodiment of the present invention.
Figure 5B:
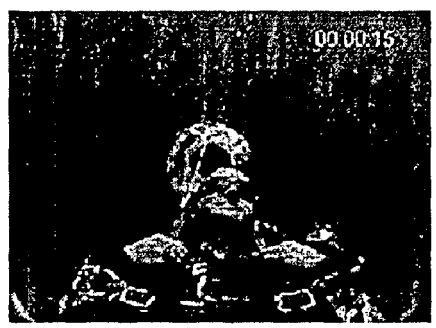
Figure 5C:
Figure 5D:
Figure 5E:
Figure 5F:
Figure 5G:
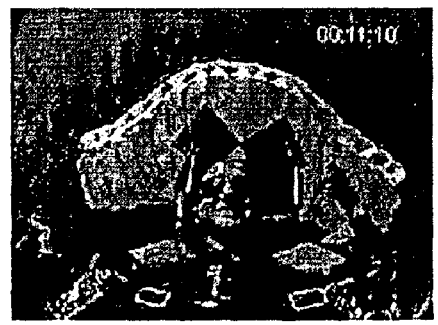
Figure 5H:
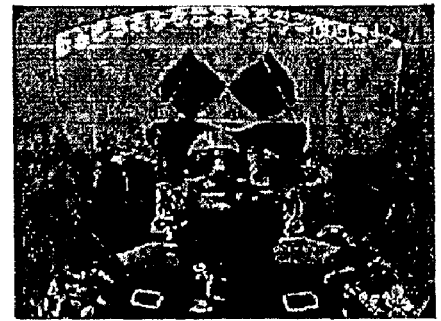

Typically, the cross ports in the ribs are substantially the same for all of the ribs of the canopy. As illustrated in FIG. 2, the ribs of a typical canopy have a substantial number of cross ports. According to an embodiment of the present invention, the cross ports on ribs is varied. For example, according to a first embodiment, the ribs between the third and fourth cells and the sixth and seventh cells of a nine cell canopy have no cross porting or substantially reduced cross ports. FIG. 3A illustrates cross ports for these ribs according to an embodiment of the present invention. The remaining ribs have greater cross porting. FIG. 3B illustrates cross ports on the remaining ribs according to an embodiment of the invention. With limited cross ports, air cannot easily pass from the innermost three cells to the outer cells. The outer cells do not have as much air entering from the inlets as the inner cells, due to the position they are put in with the slider in the up position. Therefore, without cross porting, the inner cells will fully inflate before the outer cells. This results in a two stage deployment. At an intermediate stage, as illustrated in FIG. 4A, the inner three cells are inflated while the outer six cells are still compressed. The partially open canopy slows the decent of the parachute, and pilot. When the decent slows, the forces holding up the slider drop. Thus, the reduced spreading force becomes sufficient to push the slider down the lines allowing the remaining cells to inflate, as illustrated in FIG. 4B. The opening forces on the pilot are reduced by dividing them into the two stages and over a longer period of time.

In the first embodiment, the conductance of the cross ports between certain cells is eliminated or substantially reduced. Reduction of cross port conductance can be accomplished in various ways. The present invention is not limited to the type or extent of cross ports in any particular rib. Through selection of a desired level of cross porting and the dimension of the slider and the cells, the decent rate at which the second stage of deployment occurs can be adjusted. Additionally, the present invention is not limited to two deployment stages. Cross porting between any number of cells may be eliminated or reduced to create several different stages. Furthermore, the cross porting can decrease in each of the ribs going from the center of the canopy to the outside. Such cross porting allows each set of cells, from the center outwards, to open in succession. This results in a controlled deployment at a slower rate than without the present invention. FIGS. 5A–5H illustrate deployment with time codes of a canopy according to the present invention.

Prior art canopies open faster with increased force at increased speeds. However, with the design according to the present invention, increased speed causes the delay between the first stage and the second stage to increase. While the opening forces can be higher at faster speeds, the two (2) stages significantly reduce the peak opening forces experienced by delaying how much of the canopy is presented at high speed until the speed is reduced by the partial deployment of the canopy. Tests have shown more than a ten (10) times reduction in the opening force at high speeds with the present invention over prior art canopies. This is important as parachute deployment at "free-fly style" speeds can and has resulted in serious injuries and deaths.

Figure 6A:
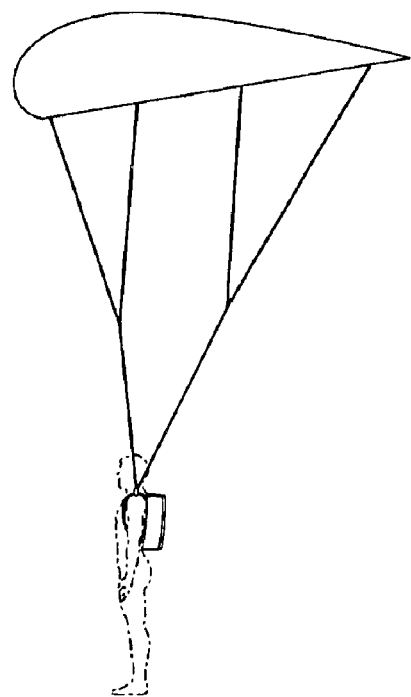
FIGS. 6A and 6B are side views illustrating trim of a ram air parachute according to embodiments of the present invention.
Figure 6B:
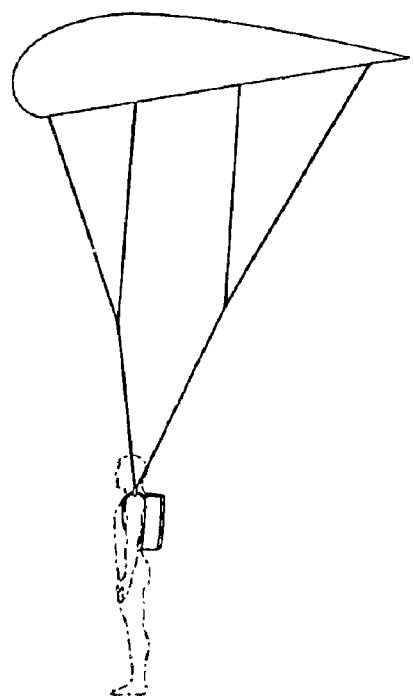

In another embodiment of the present invention, design techniques, including plan-form and line-trim set, provide additional control of the parachute deployment. In this embodiment of the invention, the suspension line trim is adjusted to prevent the nose of the outer cells from being presented during the first stage of deployment. FIG. 6A illustrates the placement of a pilot relative to the canopy in a typical configuration. FIG. 6B illustrates the placement of the pilot in the present invention. The pilot is moved away from the front edge of the canopy. This results in slightly longer suspension lines connected to the front edge of the canopy in the present invention. When the parachute is packed, the line trim and planform of the present invention causes the front edge of the canopy at the outer sides to be folded or compressed under. With the configuration of the present invention, the inlets to the center cells are exposed to the inrush of air before the outer cells. Since the inlets need to be exposed to inflate the canopy, the center cells inflate before the outer cells. The line-trim set and packing further slow down deployment of the canopy and reduce opening forces. The slowed deployment of the canopy of the present invention limits heat generated by the slider on the suspension lines. This reduces stretching and breaking of lines and extends their useful life.

While the present inventions have been described with a certain degree of particularity, it is obvious from the foregoing detailed description that one skilled in the art may make one or more modifications which are suggested by the above descriptions of the novel embodiments.

What is claimed is:

1. A ram air parachute having a control inflation upon deployment, the ram air parachute comprising:

a top skin;

a bottom skin opposite the top skin;

a plurality of ribs between the top skin and bottom skin to form a plurality of cells, each cell having an inlet at the front of the parachute, wherein at least one rib has cross porting of lower conductance from the cross porting of at least one other rib;

a plurality of suspension lines attached to the bottom skin; and a slider movably connected to the plurality of suspension lines to slow deployment of the parachute;

wherein the slider is positioned so that during deployment of the ram air parachute, an inlet for a cell on one side of the at least one rib which has cross porting of lower conductance receives air while an inlet for a cell on another side of the at least one rib which has cross porting of lower conductance does not receive air.

2. The ram air parachute according to claim 1, wherein the plurality of ribs includes:

a first plurality of ribs having a first level of cross porting conductance;

a second plurality of ribs having a second level of cross porting conductance;

a stage rib between the first plurality of ribs and the second plurality of ribs having a level of cross porting conductance which is less than the first level and the second level; and wherein, during deployment of the ram air parachute, the inlets for the cells formed by the first plurality of ribs receive air while the inlets for cells formed by the second plurality of cells do not receive air.

3. The ram air parachute according to claim 1, wherein each of the ribs in the plurality of ribs includes a level of cross porting conductance such that the conductance of cross porting for ribs towards the center of the canopy is higher than the level for ribs towards the outside of the canopy; and wherein, during deployment, cells towards the center of the canopy inflate before cells towards the outside of the canopy.

4. A method of deploying a ram air parachute having a plurality of cells in stages by controlling the conductance of its inflation air from the center cells to subsequent outer cells to cause the deploying parachute to inflate in time delayed stages in such a way as to soften opening forces until the ram air parachute is fully deployed.

5. The method of clam 4 further comprising the step of: creating a line trim, planform geometry which causes presentation of the cell inlets in order from the center towards end cells as a slider moves down suspension lines on the ram air parachute.

6. A method of deploying a rain air parachute having a plurality of cells in stages by controlling the conductance of its inflation air from the center cells to subsequent outer cells; and creating a line trim, planform geometry which causes presentation of the cell inlets in order from the center towards end cells as a slider moves down suspension lines on the ram air parachute.

* * * * *